United States Patent
Erasmus et al.

(10) Patent No.: US 7,695,612 B2
(45) Date of Patent: Apr. 13, 2010

(54) PROCESS FOR RECOVERING HEAVY MINERALS FROM OIL SAND TAILINGS

(75) Inventors: Daniel E. Erasmus, Regina (CA); Neil P. Dawson, Springwood (AU); Francis Chachula, Regina (CA)

(73) Assignee: Titanium Corporation Inc., Edmonton (CA)

( * ) Notice: Subject to any disclaimer, the term of this patent is extended or adjusted under 35 U.S.C. 154(b) by 483 days.

(21) Appl. No.: 11/420,345

(22) Filed: May 25, 2006

(65) Prior Publication Data

US 2007/0272596 A1    Nov. 29, 2007

(51) Int. Cl.
B01D 21/00 (2006.01)
C10G 1/04 (2006.01)

(52) U.S. Cl. ...................... 208/390; 208/391

(58) Field of Classification Search .................. 208/390, 208/400, 391
See application file for complete search history.

(56) References Cited

U.S. PATENT DOCUMENTS

| | | | | |
|---|---|---|---|---|
| 3,990,885 | A * | 11/1976 | Baillie et al. | 209/5 |
| 5,039,227 | A | 8/1991 | Leung et al. | |
| 6,007,708 | A | 12/1999 | Allcock et al. | |
| 6,074,558 | A * | 6/2000 | Duyvesteyn et al. | 210/611 |
| 7,341,658 | B2 | 3/2008 | Reeves | |
| 2004/0035755 | A1 * | 2/2004 | Reeves | 208/390 |
| 2007/0209971 | A1 * | 9/2007 | Duyvesteyn et al. | 208/391 |

FOREIGN PATENT DOCUMENTS

| | | |
|---|---|---|
| CA | 1072473 | 2/1980 |
| CA | 1076504 | 4/1980 |
| CA | 1088883 | 11/1980 |
| CA | 2029795 | 5/1991 |
| CA | 2015784 | 10/1991 |
| CA | 1326571 | 1/1994 |
| CA | 2217623 | 2/1999 |

* cited by examiner

*Primary Examiner*—Walter D Griffin
*Assistant Examiner*—Renee Robinson
(74) *Attorney, Agent, or Firm*—Bennett Jones LLP

(57) ABSTRACT

A process is provided for recovering heavy minerals from aqueous oil sand tailings, the oil sand tailings having heavy minerals, other coarse solids such as silica, fines, residual bitumen and water, including desliming the oil sand tailings in a desliming means by removing a portion of free fines and residual bitumen from the oil sand tailings; attritioning the oil sand tailings in an attritioner to remove adhered fines and residual bitumen from the heavy minerals and other coarse solids; and subjecting the deslimed and attritioned tailings to separation in a separation means to separate the heavy minerals from the other coarse solids present in the deslimed and attritioned tailings and produce a concentrated heavy minerals fraction.

29 Claims, 1 Drawing Sheet

PROCESS FOR RECOVERING HEAVY MINERALS FROM OIL SAND TAILINGS

The present invention relates generally to a process for recovering heavy minerals from oil sand tailings. More specifically, the present invention relates to a process for recovering a concentrated heavy minerals fraction from oil sand tailings that is amenable to further processing in order to separate it into its constitutive heavy minerals.

BACKGROUND OF THE INVENTION

Oil sand, also referred to as tar sand or bituminous sand, is a combination of clay, sand, water and bitumen that is mined below the surface of the earth. Oil sand deposits are found all over the world, the largest deposits being located in Venezuela and Alberta, Canada. On average, the bitumen content of these oil sands ranges from about 5 to 20 percent by weight or more of the total weight of oil sand. Thus, oil sands represent a rich source of heavy oil.

Surprisingly, oil sands, such as mined in Athabasca, Alberta, also contain heavy minerals such as zircon, ilmenite, rutile and leucoxene, which heavy minerals are concentrated and upgraded during processes used to extract the bitumen from oil sands. Thus, there have been a number of attempts to recover these heavy minerals from oil sand tailings that are produced after the majority of the bitumen has been extracted from the oil sands.

Several processes have been developed throughout the years for extracting bitumen from oil sands. Oil sand lends itself to liberation of the sand grains from the bitumen, preferably by slurrying the oil sand in hot process water, thereby allowing the bitumen to move to the aqueous phase. For many years, the bitumen in the Athabasca sand has been commercially removed from oil sand using what is commonly referred to in the industry as the "Clark Hot Water Process".

In general terms, the Clark Hot Water Process involves dry mining the oil sand and feeding the oil sand into a rotating tumbler where it is mixed for a prescribed retention time with hot water (approximately 80-90° C.), steam, process aids (e.g., sodium hydroxide) and naturally entrained air to yield an oil sand slurry. During slurrying, the bitumen matrix is heated and becomes less viscous, chunks of oil sand are ablated or disintegrated and the released sand grains and separated bitumen droplets are dispersed in the water to produce "conditioned" oil sand slurry.

In recent years, lower temperature extraction processes have been developed to conserve energy. For example, a "warm slurry extraction process" has been developed and is disclosed in Canadian Patent No. 2,015,784. In the warm slurry extraction process oil sand is mixed with sufficient hot water to yield an oil sand slurry having a temperature in the range of 40-55° C. Mixing and conditioning occurs in a tumbler, with retention times being increased to within the range of about 7-12 minutes to produce conditioned slurry. In the alternative, conditioning can occur in a pipeline, commonly referred to as "pipe-line conditioning", as disclosed in Canadian Patent No. 2,029,795 and U.S. Pat. No. 5,039,227.

In the late 1990s a cold dense slurrying process for extracting bitumen from oil sand was developed, which is disclosed in Canadian Patent No. 2,217,623 and U.S. Pat. No. 6,007,708. This process is commonly referred to as the "low energy extraction process" or the "LEE process" and involves mixing the mined oil sand with water in predetermined proportions near the mine site to produce a slurry containing entrained air and having a controlled density in the range of 1.4 to 1.65 g/cc and preferably a temperature in the range 20-40° C. The slurry is then pumped through a pipeline having a plurality of pumps spaced along its length, preferably adding air to the slurry as it moves through the pipeline, to condition the slurry.

The oil sand slurry produced by any of the extraction processes described above is typically diluted with additional water and the diluted slurry is introduced into a primary separation vessel (PSV) where the more buoyant aerated bitumen rises to the surface and forms a froth layer. The bitumen froth so produced is commonly referred to as "primary froth" and typically comprises 65 wt. % bitumen, 28 wt. % water and 7 wt. % solids.

Typically the PSV underflow and middlings are further treated in secondary treatment vessels such as flotation vessels or gravity separators to produce a "secondary froth" typically comprising 45 wt. % bitumen, 45 wt. % water and 10 wt. % solids. The primary and secondary froths are then pooled together for further processing.

There are other water extraction processes, such as the known OSLO process, the Bitmin process, and the Kryer process, which also produce bitumen froth that can be further processed to produce bitumen and oil sand tailings that are useful in the present invention.

The bitumen in the bitumen froth is separated from the water and solids enriched in heavy minerals by first diluting the froth with sufficient solvent or diluent such as naphtha and then subjecting the diluted froth to further processing to first remove coarse solids and then remove fines. For example, a plurality of scroll-type centrifuges could be used or a combination of scroll separators/centrifuges and disc separators/centrifuges can be used as described in Canadian Patent No. 1,072,473. It is understood by those skilled in the art that other processes can separate the bitumen from the water and solids, for example, counter-current decantation, or treatment using inclined plate settlers or stationary froth treatment, or by cyclones or some combination of these. The resultant "cleaned" bitumen is further refined into useful products and the remaining water and solids (referred to in the industry as "oil sand tailings") are disposed of in tailings ponds.

The oil sand tailings obtained from centrifugation operations and the like typically contain 16-20% solids by weight, 76-80% water by weight, and from about 2% to about 5% residual bitumen. The solids portion on average comprises 15-30 Wt. % or more heavy minerals, of which typically 30-70 wt. % consists of valuable minerals such as zircon, minerals containing titanium dioxide (e.g., ilmenite, leucoxene and rutile) and the like. The remainder of the solids, approximately 70-85% by weight, is generally comprised of fine silica, mica, petrified wood chips and fine clays. It is this oil sand tailings material that provides the feedstock suitable for use in the process of the present invention.

Because of the unique composition of the oil sand tailings obtained from oil sand extraction and bitumen froth treatment, there are many challenges one faces when attempting to separate out heavy minerals therein. The four main problem areas that have created difficulties in recovering heavy minerals from tailings, and have made it difficult to use normal mineral dressing techniques of the industry, are as follows:

1. the bitumen coating on the sand grains;
2. secondary mineralization such as pyrite, siderite and calcite;
3. a high proportion of alumino-silicates (approximately 25 percent) that have similar gravity, electrostatic and magnetic properties as other minerals in the heavy mineral suite; and
4. the presence of slimes or fines (fine particulates smaller than 45 μm in diameter) that varies between about 25-40% by weight.

Several attempts have been made to deal with the problem of residual bitumen. For example, Canadian Patent Nos. 1,076,504 and 1,088,883, describe processes in which the residual bitumen is burned off prior to the separation of the heavy minerals. However, the high temperatures used will alter the properties of the heavy minerals in such a manner that magnetic and/or electrostatic processes are no longer efficient in selectively separating out the minerals.

Canadian Patent No. 1,326,571 discloses subjecting bitumen-containing tailings obtained directly from centrifugation of bitumen froth to a high pH (from about 8 to about 11.5) flotation step in a flotation vessel by aerating the tailings, which causes the mineral values to float in a froth above the siliceous and other unwanted material. The removed froth solids are then preferably heated to burn off residual bitumen.

However, the flotation process described in Canadian Patent No. 1,326,571 is not very efficient in separating out heavy minerals for further processing due to the high concentration of bitumen present during the flotation step (i.e., from about 2 to about 5 wt. %) and the presence of fines or slimes. Furthermore, the heavy mineral froth obtained from flotation still contains a large amount of bitumen, which must subsequently be removed before further processing can occur.

It has now been discovered that the addition of (1) a desliming step, to remove a substantial amount of slimes or fines (i.e., solids less than 45 μm) and residual bitumen, and (2) an attritioning step, to remove additional fines and residual bitumen, prior to a step of separating and/or concentrating heavy minerals from the siliceous material, such as in a flotation cell or gravity concentrator, greatly improves overall recoverability of heavy minerals from oil sand tailings, and provides a concentrated heavy mineral feed material from which zircon, ilmenite, leucoxene, rutile, and the like can be separated and recovered.

SUMMARY OF THE INVENTION

In accordance with one aspect of the invention, a process is provided for recovering heavy minerals from aqueous oil sand tailings, said oil sand tailings having heavy minerals, other coarse solids such as silica, fines, residual bitumen and water, including:

(a) desliming the oil sand tailings in a desliming means by removing a portion of free fines and residual bitumen from the oil sand tailings;

(b) attritioning the oil sand tailings in an attritioner to remove a portion of adhered fines and residual bitumen from the heavy minerals and other coarse solids; and (c) subjecting the deslimed and attritioned tailings to separation in a separation means to separate the heavy minerals from the other coarse solids present in the deslimed and attritioned tailings and produce a concentrated heavy minerals fraction.

It is understood by those skilled in the art that the residual bitumen concentration in the oil sand tailings feed varies depending on the grade of oil sand, the bitumen extraction process used, etc. Hence, the concentrated heavy minerals fraction obtained from the preceding process may optionally be further subjected to a washing step to remove residual bitumen that may still be adhered to the concentrated heavy minerals. Thus, in another aspect of the invention, a process as described above is provided for preparing heavy minerals from oil sand tailings, said oil sand tailings having heavy minerals, other coarse solids such as silica, fines, residual bitumen and water, including:

(d) removing a portion of any remaining residual bitumen from the concentrated heavy minerals fraction to produced a washed concentrated heavy minerals fraction.

In one embodiment, remaining residual bitumen is removed from the concentrated heavy minerals fraction by using any stirred reactor or vessel known in the art, commonly referred to as an attritioner. The step of removing remaining residual bitumen from the concentrated heavy minerals fraction may be carried out with or without the addition of a processing aid such as a solvent or demulsifier, for example, petroleum naphtha, toluene and the like, or surfactant based chemicals such as sorbitols, amines, butyl resins, esters and the like. The step of removing remaining residual bitumen from the concentrated heavy minerals fraction is preferably carried out at a temperature in the range of from about 15° C. to about 80° C.

By "heavy minerals" is meant minerals generally having a specific gravity greater than about 2.85, and include, without being limited to, such minerals as rutile, ilmenite, leucoxene, siderite, anatase, pyrite, zircon, tourmaline, garnet, magnetite, monazite, kyanite, staurolite, mica and chlorite.

By "fines" is meant particles such as colloidal clay or silt having any dimension less than 45 μm and are also sometimes referred to as "slimes".

By "other coarse solids" is meant solids other than heavy minerals and fines, generally having any dimension greater that about 45 μm and primarily comprising silica or quartz. Other coarse solids are also referred to as gangue or unwanted solids.

By "desliming" is meant separating and removing residual bitumen and fines or slimes from the heavy minerals and other coarse solids.

By "enhanced gravity separator" is meant a separator that operates at a G force greater than 1.

By "attritioning" is meant a process of scrubbing the surfaces of solids such as heavy minerals and other coarse solids such as silica in an attritioner (also referred to as an attrition scrubber), where chemical conditions, mechanical intensity and residence time are controlled, in order to prepare the surfaces and, in more particularly, to remove adhered bitumen and/or fines and accretions.

By "attritioner" is meant any stirred reactor or vessel having sufficient agitation to scrub the surfaces of solid particles.

In one embodiment, the step of desliming the oil sand tailings is carried out in an enhanced gravity separator, for example, a hydrocyclone or a centrifuge, such as a low speed centrifuge, or a series of hydrocyclones or centrifuges, or a combination of hydrocyclones and centrifuges.

In another embodiment, the step of attritioning is carried out in an attritioner with or without the addition of a processing aid such as a demulsifier, for example, surfactant based chemicals such as sorbitols, xylenes, butyl resins and esters. In a preferred embodiment, attritioning is carried out at a temperature in the range of from about 15° C. to about 95° C.

In one embodiment, the step of separating the heavy minerals from other coarse solids is carried out in a separation means comprising a conventional flotation vessel or cell wherein the deslimed and attritioned tailings are aerated so that the heavy minerals float to the top of the vessel or cell to form a concentrated heavy minerals fraction (as a froth) and the other coarse solids such as silica settle at the bottom of the vessel or cell and are discarded as flotation tailings. In a preferred embodiment, the separation step using the flotation vessel or cell is carried out at a pH in the range of from about 7.0 to about 11.5, more preferably at a pH between about 7.0 and about 8.5.

In one embodiment, the separation step using a flotation vessel or cell is carried out at a temperature in the range of from about 15° C. to about 35° C. In another embodiment, the separation step using a flotation vessel or cell is carried out with or without the addition of a fuel oil such as kerosene or naphtha. In yet another embodiment, the separation step using the flotation vessel or cell is carried out in the presence of a frothing agent such as alcohol based frothers or glycol (e.g., polypropylene or polyethylene glycols and their ethers) based frothers. Methyl isobutyl carbinol (MIBC) and pine oil are examples of suitable alcohol based frothers and Cytec Industries Oreprep F-507 or Dow Chemical's Dowfroth 250 are examples of suitable glycol frothers. Alternative chemical reagents containing carboxyl, carbonyl, amino and sulphyl groups could also be used as well as other additives such as conditioners and wetting agents.

In another embodiment, the step of separating the heavy minerals from other coarse solids present in the prepared tailings fraction is carried out in a separation means comprising a wet gravity concentration circuit having heavy mineral spirals, jigs, upstream classifiers or shaking tables, or various combinations thereof.

In a further embodiment, the step of separating the heavy minerals from other coarse solids is carried out in an enhanced gravity separator such as a low speed centrifuge, for example, a Continuous Variable-Discharge (CVD) concentrator such as the Knelson™ Concentrator, which was developed to address specific mineral recovery applications which are amenable to enhanced gravity separation.

It is understood that the separation step for separating the heavy minerals from other coarse solids can be repeated a number of times. In addition, the separation step can be carried out by a combination of separation means as described above. For example, the separation step can be carried out first in a flotation cell followed by separation in another flotation cell or series of flotation cells, an enhanced gravity separator such as a low speed centrifuge, or a gravity separator such as a spiral, or any combination thereof.

The concentrated heavy minerals fractions produced by the present invention (i.e., either the washed or unwashed fractions) can now be used as a feedstock for recovering valuable heavy minerals such as zircon, ilmenite and rutile by using conventional heavy mineral processing steps and devices known in the art. In one embodiment, the washed or unwashed concentrated heavy minerals fraction is further subjected to a dewatering step using a dewatering means such as a hydrocyclone, centrifuge, a horizontal belt filter, and the like, to form a dewatered concentrated heavy minerals fraction. In another embodiment the concentrated heavy minerals fraction (washed or unwashed) or the dewatered concentrated heavy minerals fraction (washed or unwashed) may be further subjected to a drying step which includes heating the fraction to a temperature sufficient to remove substantially all of the water, preferably, to a temperature in the range of from about 100° C. to about 200° C. prior to subjecting it to conventional mineral separation processes for further separation.

In another embodiment, the dried heavy minerals fraction may be subjected to the further step of baking or devolatilizing, which includes heating the fraction to a temperature sufficient to remove any remaining residual bitumen without oxidizing any pyrite or converting any iron present in ilmenite from ferrous iron to ferric iron, preferably to a temperature in the range of from about 200° C. to about 350° C. In a further embodiment, the baked heavy minerals fraction is cooled with ambient air prior to further mineral processing.

The inclusion of the desliming and attritioning steps improves both the quality and the quantity of the concentrated heavy minerals fraction recovered from oil sand tailings primarily by improving the overall effectiveness of the separation step.

By way of example, when the separation step is carried out in a flotation vessel or cell, improved recovery is in part due to the fact that much of the fines have been removed as a result of the desliming and attritioning steps. It has been discovered that the presence of too much slimes or fines has a detrimental effect on the flotation of the valuable heavy minerals, resulting in longer residence times and higher chemical (e.g., frothing agent) consumption, when frothing chemicals are used. Ultimately, this results in a lower recovery of the valuable heavy minerals in the froth.

In addition, both the recovery of heavy minerals and quality of the recovered heavy minerals is improved as a result of the removal of residual bitumen from the heavy minerals and other coarse solids during the desliming and attritioning steps. The presence of too much residual bitumen, which tends to form a thin coating around both the heavy minerals and the other coarse solids such as silica, will cause the coarse solids (e.g., silica) to float to the top along with the valuable heavy minerals, thereby substantially reducing the quality of the cleaned heavy minerals fraction. Furthermore, too much residual bitumen adhered to the heavy mineral particles will interfere in any further mineral processing.

Hence, desliming and attritioning the oil sand tailings prior to subjecting the tailings to separation in a flotation vessel or cell improves both the amount of valuable heavy minerals that float to the top of the flotation cell and the quality of the floated product. Prior to desliming and attritioning, oil sand tailings routinely contain anywhere from about 10% to about 45% by mass fines or slimes. The desliming and attritioning steps of the present invention routinely reduce the fines concentration to 10% or less by mass. Furthermore, the desliming and attritioning steps of the present invention routinely remove on average more than 75% of the residual bitumen.

DESCRIPTION OF THE PREFERRED EMBODIMENT

Figure 1:
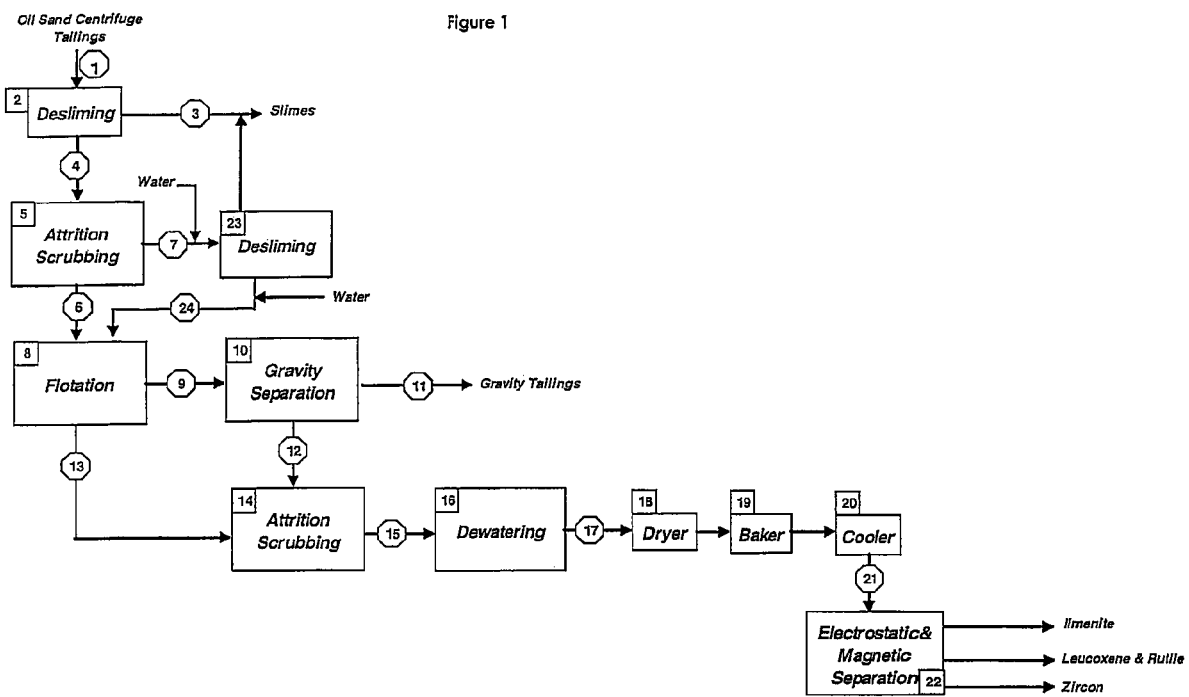
FIG. 1 is a block diagram setting forth a process for preparing heavy minerals fractions in accordance with the invention.

The invention is exemplified by the following description and examples.

FIG. 1 is a block diagram illustrating one embodiment of the process of the present invention, and is referred to by the general character 30. Aqueous oil sand tailings 1, which have been produced as a by-product of any of the oil sand extraction processes known in the art, are initially fed to a desliming means 2 for removal of fines and free residual bitumen, which is referred to herein as desliming. Desliming means 2 may comprise any number of enhanced gravity separators known in the art, for example, any number (one or more) of hydrocyclones or centrifuges, e.g., low speed centrifuges, or a combination of hydrocyclones and centrifuges. The cyclonic or centrifugal forces of these enhanced gravity separators assist in separating the fines and free residual bitumen from the heavy minerals and other coarse solids.

By way of example, when desliming means 2 comprises a hydrocyclone, the resulting cyclonic effect forces the heavy minerals and other coarse solids to the wall of the hydrocyclone and they exit from the bottom of the hydrocyclone as an underflow, referred to herein as deslimed oil sand tailings 4.

The fines (slimes) and free residual bitumen, both of which remain suspended in the water, exit the hydrocyclone as an overflow stream 3.

Hydrocyclones can be replaced with centrifuges known in the art. Generally, centrifuges comprise a conical drum that rotates at a speed sufficient to separate the heavy minerals and other coarse solids from the fines and free residual bitumen, which remain suspended in water. The heavy minerals and solids are moved up the bowl of the centrifuge by, for example, a rotating scroll, to exit at one end while the fines and free residual bitumen suspended in water exit at the other end.

The deslimed oil sand tailings 4 are then fed into an attritioning means 5, such as a Denver Cell™ type attritioner at a solids density between about 60% and about 75% by weight where the grain surfaces of the heavy minerals and other coarse solids are scrubbed to remove additional adhered fines and residual bitumen. As mentioned, various processing aids such as demulsifiers may be added to the attritioning means and, preferably, the temperature of the attritioning means is generally between about 20° C. to about 95° C.

The attritioned oil sand tailings 6 may then be subjected to a separation step in a separation means 8 to separate the heavy minerals from the other coarse solids and produce a concentrated heavy minerals fraction. For example, as shown in FIG. 1, the attritioned tailings fraction may be subjected to separation in a flotation cell. In the alternative, prior to heavy mineral separation, water may be added to the attritioned oil sand tailings and the diluted attritioned oil sand tailings 7 subjected to a second desliming step, such as in a cyclonic separator 23. In this instance, concentrated attritioned tailings 24 from cyclonic separator 23 may need to be first diluted with water to obtain slurry having a solids content between 20% and 40% by weight prior to subjecting them to separation in flotation cell 8.

The attritioned tailings fraction is particularly amenable to froth flotation procedures due to the fact that much of the slimes/fines and residual bitumen, which tend to coat the individual grains, have been removed from the tailings by the prior desliming and attritioning steps. Various frothing agents such as alcohols or glycols can be added to aid in the heavy minerals froth formation. Further, other processing aids such as conditioners and wetting agents may also be used such as a fuel oil like kerosene or naphtha to aid in heavy mineral recovery.

The concentrated heavy minerals fraction 13 is removed from the top of the flotation cell (as froth) and the other coarse solids are removed as tails 9. It is understood that other separation means such as heavy mineral spirals, jigs, upstream classifiers, shaking tables, enhanced gravity separators, or various combinations thereof, can also be used to produce concentrated heavy minerals fraction 13. For example, the prepared tailings fraction 6 can be subjected to separation (and concentration) by using an enhanced gravity separator such as a continuous centrifugal concentrator, for example, a Falcon type or a Knelson™ Continuous Variable-Discharge (CVD) concentrator which uses fluid-bed technology. The Knelson™ concentrator delivers a continuous stream of concentrate, containing the heavy minerals, while the coarse lighter solids such as silica are rejected as a tailings stream.

The coarse solids tails 9 may be further treated to recover any entrained heavy minerals by subjecting them to gravity separation using at least one gravity separator 10, for example, such as spirals and other high G-force separation type vessels. The resulting coarse silica tailings 11 are discarded and the heavy minerals fraction 12 may be combined with the flotation froth concentrate 13 to produce a combined concentrated heavy minerals fraction useful for further minerals separation processes known in the art.

Optionally, the concentrated heavy minerals fractions 12 and 13 may be further washed in a stirred reactor 14 to remove any residual bitumen that may still be adhered to the heavy mineral particles. Stirred reactor 14 may be an attritioner, attrition scrubber or mixing vessel and may be carried out in the presence of a processing aid such as a solvent or demulsifier, for example, petroleum naphtha, toluene, etc., surfactant based chemicals such as sorbitols, amines, butyl resins and esters, etc. The washing step is preferably carried out at a temperature in the range of from about 15° C. to about 80° C. The solvent dissolves the adhered bitumen from the heavy mineral surfaces and provides a medium to separate the bitumen away from the heavy mineral fraction.

In some instances it is desirable and more economical to remove as much excess water from the washed concentrated heavy minerals fraction 15 as possible prior to transporting the cleaned heavy minerals fraction to the dry mill for further processing. Thus, the washed concentrated heavy minerals fraction 15 can optionally be further dewatered in a dewatering means 16 comprising a hydrocyclone, centrifuge, filter device, or the like. For example, the washed concentrated heavy minerals fraction 15 can be dewatered using a filter device such as a horizontal belt filter or a stockpile drainage system and can then simply be dried in a suitable device (e.g., a rotary dryer or a fluidized bed dryer) or can be dried, baked and cooled as described below.

After dewatering, the dewatered heavy minerals fraction 17 may be further dried in dryer 18, which is preferably operated at a temperature of between about 100° C. to about 200° C. In addition, the dried minerals fraction may be baked in a baker unit 19, which is preferably operated at a temperature between about 200° C. to about 350° C. Baking ensures that any remaining residual bitumen will be removed without oxidizing any pyrite or converting any iron present in ilmenite from ferrous iron to ferric iron. Finally, the baked heavy minerals fraction may be cooled in cooling unit 20 prior to further processing. Alternatively, the washed concentrated heavy mineral fraction 15, which hasn't been dewatered, can also go directly to be dried, baked and cooled.

The dried and cooled heavy minerals fraction 21 can now be separated into its constitutive heavy minerals by conventional mineral separation processes. By way of example, the dried heavy minerals fraction can be subjected to various stages of high-tension separation to separate the conductive titanium and iron bearing minerals from non-conductive minerals such as zircon, garnet, tourmaline and other alumino-silicates.

Magnetic separation may then be conducted on the conductor fraction to separate different grades of titanium minerals, as required by market conditions. If no magnetic separation is conducted, the average titanium grade is approximately 68-70% $TiO_2$, which is readily saleable, but can be further separated as needed for specific users. Increasing or decreasing the intensity of magnetic separation, as required for specific purchasers, can produce other $TiO_2$ fractions. It is observed through magnetic fractionation of these products that there is a direct relationship between magnetic field intensity in separation and $TiO_2$ content, due to the fact that rutile (95% $TiO_2$) is less magnetic than leucoxene (60-85% $TiO_2$).

Non-conductive minerals are further separated to recover zircon from garnets and other alumino-silicates. A premium ceramic grade zircon product may be produced, along with a garnet product for abrasives market.

EXAMPLE I

(a) Oil Sand Tailings

Fresh oil sand tailings were obtained after centrifugation of diluted bitumen froth in Centrifuge Plants known in the art. Table 1 gives the properties of a typical oil sand tailings preparation useful in the present invention.

TABLE 1

| | |
|---|---|
| Slurry temperature: | 90-95° C. |
| Slurry pH: | 8.0-9.0 |
| % Solids in Slurry: | 12%-25% |
| Total Heavy Mineral Content of solids: | 15%-40% |
| Bitumen Content (Dry Basis): | 3.5%-5.0% |

Table 2 gives the typical screen analysis of the 12-25% solids, of which 15-40% are heavy minerals, which are found in oil sand tailings.

TABLE 2

| Screen Size | Fractional Mass % |
|---|---|
| +1 mm | 0.5-1.0 |
| −1 mm + 500 μm | 1.0-3.0 |
| −500 μm + 45 μm | 65-85 |
| −45 μm | 25-40 |

It can be seen from Table 1 that oil sand tailings still comprise a significant amount of bitumen (3.5-5.0%), which can create significant problems when trying to reclaim the heavy minerals. Further, it can be seen from Table 2 that 25-40% of the total solids in the tailings are fines or slimes having a dimension less than 45 μm, and these fines also interfere in the reclamation of heavy minerals.

(b) Desliming of the Oil Sand Tailings

Oil sand tailings are preferably subjected to desliming in a cyclonic separator or hydrocyclone.

The properties of typical deslimed tailings are given in Table 3. Table 4 gives the typical screen analysis of the 55%-75% solids present in the deslimed tailings, of which 20-50% are heavy minerals.

TABLE 3

| | |
|---|---|
| Slurry stream temperature: | 90-95° C. |
| Slurry stream pH: | 8.0-9.0 |
| % Solids in slurry stream: | 55%-75% |
| Total Heavy Mineral Content of solids: | 20%-50% |
| Bitumen Content (Dry Basis): | 1.5%-4.0% |

TABLE 4

| Screen Size | Fractional Mass % |
|---|---|
| +1 mm | 0.5-2.0 |
| −1 mm + 500 μm | 2.0-5.0 |
| −500 μm + 45 μm | 85-95 |
| −45 μm | 5-15 |

It can be seen from Table 3 that a significant amount of bitumen has been removed (the amount of bitumen (dry basis) typically being reduced to about 1.5%-4.0%. Even more significantly, it can be seen from Table 4 that the amount of slimes present in the solids fraction has been reduced to a mass % of 5-15 as compared to a mass % of 25-40 in typical oil sand tailings.

(c) Attritioning Step

Deslimed tailings were subjected to attritioning in a twin cell agitated attritioner as known in the art fitted with high shear propeller blades. The properties of typical deslimed and attritioned tailings are given in Table 5. The typical screen analysis of the solids present in the deslimed and attritioned tailings is given in Table 6. Analysis was done after concentrating the deslimed and attritioned tailings in a hydrocyclone.

TABLE 5

| | |
|---|---|
| Slurry stream temperature: | 90-95° C. |
| Slurry stream pH: | 7.0-8.5 |
| % Solids in slurry stream: | 55%-75% |
| Total Heavy Mineral Content of solids: | 20%-50% |
| Bitumen Content (Dry Basis): | 1.5%-3.5% |

TABLE 6

| Screen Size | Fractional Mass % |
|---|---|
| +1 mm | 0.5-2.0 |
| −1 mm + 500 μm | 2.0-4.0 |
| −500 μm + 45 μm | 85-95 |
| −45 μm | 5-12 |

The bitumen content is determined using the Dean & Stark method whereby the material is boiled in toluene to dissolve the bitumen. By dry basis is meant a calculation relative to the solids fraction only, thus excluding water.

It can be seen from Table 6 that less than 5-12 mass % of the solids still remaining in the deslimed and attritioned tailings are less than 45 μm, indicating that most of the fines have been removed during the desliming and attritioning steps.

(d) Flotation in Flotation Vessel

Deslimed and attritioned tailings were subjected to flotation in multiple stirred cells in series using standard equipment of the square cells and U-shaped cells of tank cell design. Forced air is introduced via the impeller for froth formation, to produce a concentrated heavy minerals fraction in the froth. The properties of typical concentrated heavy minerals fraction are given in Table 7. The typical screen analysis of the solids present in concentrated heavy minerals fraction is given in Table 8.

TABLE 7

| | |
|---|---|
| Slurry stream temperature: | 15-25° C. |
| Slurry stream pH: | 7.0-8.0 |
| % Solids in slurry stream: | 15%-25% |
| Total Heavy Mineral Content of solids: | 65%-90% |
| Bitumen Content (Dry Basis): | 3%-7.0% |

TABLE 8

| Screen Size | Fractional Mass % |
|---|---|
| +1 mm | 0.1-0.5 |
| −1 mm + 500 μm | 0.5-2.0 |
| −500 μm + 45μ | 85-95 |
| −45 μm | 5-10 |

The effectiveness of the flotation step can be seen from the values in Table 7 wherein the total heavy minerals content of the solids is now 65%-90% by weight.

(e) Drying/Baking/Cooling Process

Drying/baking/cooling of the concentrated heavy minerals fraction is done in a three stage rotary kiln system or a three stage fluid bed reactor system. The properties of the dried heavy minerals concentrate after exiting the dryer/baker/cooler (DBC) unit are shown in Table 9 and the typical screen analysis is shown in Table 10.

TABLE 9

| | |
|---|---|
| DBC Exit Stream temperature: | 100-150° C. |
| Total Heavy Mineral Content of solids: | 65-90% |
| DBC Exit Stream Bitumen Content (Dry Basis): | <0.5% |

TABLE 10

| Screen Size | Fractional Mass % |
|---|---|
| +1 mm | 0 |
| −1 mm + 500 μm | 1.0-3.0 |
| −500 μm + 45μ | 90-99 |
| −45 μm | 1-5 |

We claim:

1. A process for recovering heavy minerals from aqueous oil sand tailings, said oil sand tailings comprising heavy minerals, other coarse solids including silica, fines, residual bitumen and water, comprising:
   desliming the oil sand tailings in at least one gravity separator by removing a portion of free fines, water and residual bitumen from the oil sand tailings;
   attritioning the oil sand tailings in an attritioner to remove a portion of adhered fines and residual bitumen from the heavy minerals and other coarse solids; and
   subjecting the deslimed and attritioned tailings to flotation in at least one flotation apparatus to separate the deslimed and attritioned tailings into heavy minerals-rich froth and other coarse solids tailings.

2. The process as claimed in claim 1 further comprising: washing the heavy minerals in the heavy minerals-rich froth to remove a portion of any remaining residual bitumen therefrom to produce a washed heavy minerals fraction.

3. The process as claimed in claim 2 further comprising: drying the washed heavy minerals fraction by heating the fraction to a temperature sufficient to remove substantially all of the water therein to produce a dried heavy minerals fraction.

4. The process as claimed in claim 3 wherein the temperature is in the range of from about 100° C. to about 200° C.

5. The process as claimed in claim 3 further comprising: baking the dried heavy minerals fraction by heating the fraction to a temperature sufficient to remove any remaining residual bitumen without oxidizing any pyrite or converting any iron present in ilmenite from ferrous iron to ferric iron; and
   cooling the baked heavy minerals fraction with ambient air.

6. The process as claimed in claim 5 wherein the dried heavy minerals fraction is heated to a temperature in the range of from about 200° C. to about 350° C.

7. The process as claimed in claim 2 wherein the heavy minerals in the heavy minerals-rich froth are washed in a stirred reactor or attritioner.

8. The process as claimed in claim 7 wherein a processing aid is added to the stirred reactor or attritioner.

9. The process as claimed in claim 8 wherein the processing aid is a solvent or demulsifier.

10. The process as claimed in claim 2 further comprising dewatering the washed heavy minerals fraction to remove a substantial portion of water therein to produced a dewatered heavy minerals fraction.

11. The process as claimed in claim 10 further comprising:
   baking the dewatered heavy minerals fraction by heating the fraction to a temperature sufficient to remove any remaining residual bitumen without oxidizing any pyrite or converting any iron present in ilmenite from ferrous iron to ferric iron; and
   cooling the baked heavy minerals fraction with ambient air.

12. The process as claimed in claim 1 wherein the at least one gravity separator comprises at least one enhanced gravity separator.

13. The process as claimed in claim 12 wherein the at least one enhanced gravity separator is a hydrocyclone or a series of hydrocyclones.

14. The process as claimed in claim 12 wherein the at least one enhanced gravity separator is a centrifuge or a series of centrifuges.

15. The process as claimed in claim 1 wherein the at least one gravity separator comprises a hydrocyclone, a centrifuge or a combination thereof.

16. The process as claimed in claim 1 wherein the attritioning step is carried out in the presence of a processing aid.

17. The process as claimed in claim 16 wherein the processing aid is a demulsifier.

18. The process as claimed in claim 1 wherein the attritioning step is carried out at a temperature in the range of from about 15° C. to about 90° C.

19. The process as claimed in claim 1 wherein air or gas is added to the flotation apparatus to assist in floating the heavy minerals-rich froth to the top of the apparatus.

20. The process as claimed in claim 1 further comprising adding a flotation aid such as a frothing agent, conditioner or wetting agent to the flotation apparatus.

21. The process as claimed in claim 1 wherein the flotation apparatus is operated at a pH in the range of from about 7.0 to about 8.5.

22. The process as claimed in claim 1 wherein the flotation apparatus is operated at a temperature in the range of from about 15° C. to about 35° C.

23. The process as claimed in claim 1 wherein a frothing agent is added to the flotation apparatus.

24. The process as claimed in claim 23 wherein the frothing agent is a polyglycol.

25. The process as claimed in claim 1 further comprising:
   drying the heavy minerals-rich froth by heating the froth to a temperature sufficient to remove substantially all of the water therein.

26. The process as claimed in claim 25 wherein the temperature is in the range of from about 100° C. to about 200° C.

27. The process as claimed in claim 25 further comprising:
   baking the dried heavy minerals fraction by heating the fraction to a temperature sufficient to remove any remaining residual bitumen without oxidizing any pyrite or converting any iron present in ilmenite from ferrous iron to ferric iron; and
   cooling the baked heavy minerals fraction with ambient air.

28. The process as claimed in claim 27 wherein the dried heavy minerals fraction is heated to a temperature in the range of from about 200° C. to about 350° C.

29. The process as claimed in claim 1 further comprising subjecting the deslimed and attritioned tailings to a second desliming step prior to subjecting the deslimed and attritioned tailings to flotation in the flotation apparatus.

* * * * *